United States Patent
Fujieda et al.

(10) Patent No.: US 8,208,718 B2
(45) Date of Patent: Jun. 26, 2012

(54) METHOD FOR DERIVING PARAMETER FOR THREE-DIMENSIONAL MEASUREMENT PROCESSING AND THREE-DIMENSIONAL VISUAL SENSOR

(75) Inventors: Shiro Fujieda, Kyoto (JP); Atsushi Taneno, Kyoto (JP); Hiroshi Yano, Toyonaka (JP); Yasuyuki Ikeda, Ikeda (JP)

(73) Assignee: Omron Corporation, Kyoto (JP)

( * ) Notice: Subject to any disclaimer, the term of this patent is extended or adjusted under 35 U.S.C. 154(b) by 265 days.

(21) Appl. No.: 12/711,179

(22) Filed: Feb. 23, 2010

(65) Prior Publication Data
US 2010/0232682 A1 Sep. 16, 2010

(30) Foreign Application Priority Data
Mar. 12, 2009 (JP) ............... P2009-059922

(51) Int. Cl.
*G06K 9/00* (2006.01)
(52) U.S. Cl. ........ 382/154; 382/218; 382/199; 382/201; 382/232; 382/253; 382/305; 382/116; 713/186
(58) Field of Classification Search .......... 382/154, 382/218, 199, 201, 232, 253, 305, 116; 713/186
See application file for complete search history.

(56) References Cited

U.S. PATENT DOCUMENTS

| | | |
|---|---|---|
| 6,445,815 B1 | 9/2002 | Sato |
| 7,003,136 B1 | 2/2006 | Harville |
| 2002/0187831 A1 | 12/2002 | Arikawa et al. |
| 2004/0153671 A1 | 8/2004 | Schuyler et al. |
| 2004/0247174 A1 | 12/2004 | Lyons et al. |
| 2005/0111703 A1* | 5/2005 | Merbach et al. ............. 382/116 |
| 2005/0286767 A1 | 12/2005 | Hager et al. |

(Continued)

FOREIGN PATENT DOCUMENTS

| | | |
|---|---|---|
| JP | 10-269362 A | 10/1998 |
| JP | 2961264 | 8/1999 |
| JP | 2000-094374 A | 4/2000 |
| JP | 2006-250889 A | 9/2006 |

OTHER PUBLICATIONS

Kawai, Y. et al., "Stereo Correspondence Using Segment Connectivity", *Journal of Information Processing*, vol. 40, No. 8, Aug. 1999, pp. 3219-3229. USPTO Office Action on U.S. Appl. No. 12/710,266 dated Feb. 23, 2012; 11 pages.
Zhengyou Zhang, A Flexible New Technique for Camera Calibration, Technical Report MSR-TR-98-71; Dec. 2, 1998, Microsoft Research, Microsoft Corporation, Redmond, WA 98052; pp. 1-21.
USPTO Office Action on U.S. Appl. No. 12/711,028 dated Mar. 16, 2012; 12 pages.

*Primary Examiner* — Mike Rahmjoo
(74) *Attorney, Agent, or Firm* — Foley & Lardner LLP

(57) ABSTRACT

In the present invention, processing for setting a parameter expressing a measurement condition of three-dimensional measurement to a value necessary to output a proper recognition result is easily performed. The three-dimensional measurement is performed to stereo images of real models WM1 and WM2 of a workpiece using a measurement parameter set by a user, and positions and attitudes of the workpiece models WM1 and WM2 are recognized based on the measurement result. An image expressing the recognition result is displayed, and numerical data indicating the selected recognition result is set to sample data in response to a user manipulation for selecting the recognition result. A setting value of the measurement parameter is changed every time in a predetermined numerical range, the three-dimensional measurement and recognition processing are performed using the setting measurement parameter, and a numerical range of the setting parameter is set to an acceptable range when the recognition result in which an amount of difference with sample data falls within a predetermined value is obtained. An intermediate value of the acceptable range is fixed and registered as an optimum value of the parameter.

4 Claims, 10 Drawing Sheets

U.S. PATENT DOCUMENTS

| | | |
|---|---|---|
| 2006/0050087 A1 | 3/2006 | Tanimura et al. |
| 2008/0212887 A1* | 9/2008 | Gori et al. .................. 382/248 |
| 2008/0303814 A1* | 12/2008 | Ishiyama .................. 345/419 |
| 2010/0231690 A1 | 9/2010 | Fujieda et al. |
| 2010/0231711 A1 | 9/2010 | Taneno et al. |
| 2010/0232647 A1 | 9/2010 | Fujieda et al. |
| 2010/0232681 A1 | 9/2010 | Fujieda et al. |
| 2010/0232683 A1 | 9/2010 | Fujieda et al. |
| 2010/0232684 A1 | 9/2010 | Fujieda et al. |

* cited by examiner

WM1

WM1

METHOD FOR DERIVING PARAMETER FOR THREE-DIMENSIONAL MEASUREMENT PROCESSING AND THREE-DIMENSIONAL VISUAL SENSOR

The present invention is based on Japanese Patent Application No. 2009-059922 filed with the Japan Patent Office on Mar. 12, 2009, the entire content of which is hereby incorporated by reference.

BACKGROUND OF THE INVENTION

1. Technical Field

The present invention relates to a method for setting a parameter expressing a measurement condition of three-dimensional measurement to a three-dimensional visual sensor and the three-dimensional visual sensor to which the method is adopted. In the three-dimensional visual sensor, the three-dimensional measurement is performed by image processing, predetermined recognition processing is performed based on a measurement result, and a recognition result is outputted as numerical data.

2. Related Art

For example, when three-dimensional recognition processing is performed in order to cause a robot to grasp a component in a manufacturing scene, three-dimensional information restored by three-dimensional measurement of a stereo camera is checked with a previously registered three-dimensional model of a recognition-target object to recognize a position and an attitude (specifically, a rotation angle with respect to three-dimensional model) of the recognition-target object (for example, see Japanese Unexamined Patent Publication No. 2000-94374).

In this kind of recognition processing, there has been proposed a method (segment based stereo method) in which an edge in a stereo image is divided into units called "segment", and a stereo correspondence search is performed in units of segments to restore three-dimensional information on a contour (see "Correspondence Evaluation Based On Connectivity In Segment Based Stereo", Journal of Information Processing, vol. 40, No. 8, pp. 3219-3229, August, 1999).

Recently the applicant develops a general-purpose three-dimensional visual sensor. In the general-purpose three-dimensional visual sensor, it is necessary that a user perform setting processing such as camera positioning, calibration, and three-dimensional model registration. Additionally, it is necessary that the user set various parameters expressing measurement conditions according to a processing purpose or a feature of a recognition-target object.

For example, in the three-dimensional measurement in which the stereo image is used, generally an edge in an image is extracted as a measurement target. In such cases, it is necessary to set a threshold of density gradient strength such that the edge of the target is accurately extracted. Occasionally various measurement conditions concerning supplementation of a feature point and noise reduction are set in order to enhance recognition accuracy even after a three-dimensional coordinate is computed by correlating the stereo images to each other.

Accordingly, in order to perform stable recognition, it is necessary to set various parameters expressing the measurement conditions to proper values. However, in order to find optimum values of the parameters, test measurement and recognition processing are repeated while the parameter settings are changed, and it is necessary that the recognition result is confirmed every time, which uses a large amount of user's energy. Moreover, when a load on the user is increased by the work, versatility and user-friendliness of the device are lost.

SUMMARY

The present invention has been devised to solve the problems described above, and an object thereof is to easily perform processing for setting a parameter expressing a measurement condition of three-dimensional measurement to a proper value.

In accordance with one aspect of the present invention, a method for deriving a parameter for three-dimensional measurement processing according to the present invention is applied to a three-dimensional visual sensor. In the three-dimensional visual sensor, a recognition-target object is imaged with an imaging unit, three-dimensional measurement is performed using a recognition-target object image produced by the imaging, and predetermined recognition processing is performed based on a three-dimensional measurement result to output the recognition result as numerical data. For example, the three-dimensional visual sensor outputs a coordinate indicating a position of the recognition-target object as the numerical data. Moreover, the three-dimensional visual sensor may output the coordinate indicating the position of the recognition-target object and an angle expressing an attitude of the recognition-target object. Alternatively, the three-dimensional visual sensor may output a Z-coordinate indicating a height of the recognition-target object or a degree of coincidence of the recognition-target object to a three-dimensional model.

In the present invention, first, second, and third steps described below are performed in order to set the parameter expressing a measurement condition of the three-dimensional measurement such that the pieces of numerical data express a recognition result concerning the recognition-target object.

In the first step, after processing for imaging a real model of the recognition-target object with the imaging unit and processing for receiving a manipulation of setting the parameter to a predetermined value are performed, the three-dimensional measurement and the recognition processing are performed based on the parameter of the received setting value using the real model image produced by the imaging, and information indicating a recognition result is displayed.

In the second step, a numerical range of the parameter, which is set while numerical data in which an amount of difference with sample data falls within a predetermined value, is performed by performing a step A and a step B in a plurality of cycles. In the step A, numerical data indicating the recognition result is set to the sample data when a manipulation of adopting the displayed recognition result is performed, the setting value of the parameter is changed every time within a predetermined numerical range including the parameter value set in the first step, and the three-dimensional measurement is performed by the set parameter using the real model image. In the step B, recognition processing is performed based on the three-dimensional measurement result of the step A to check numerical data indicating the recognition result with the sample data.

In the third step, a numerical value is registered in a memory of the three-dimensional visual sensor, the numerical value being located at predetermined distances from an upper limit and a lower limit of the numerical range specified in the second step.

With the above-described method, when the user sets the parameter in the determination of the user, the three-dimensional measurement and the recognition processing are performed using the parameter, and the information indicating the recognition result is displayed. When the user determines that the proper recognition result is obtained to perform the manipulation of adopting the recognition result, the numerical data indicating the recognition result is set to the sample data, the three-dimensional measurement and the recognition processing are performed with a plurality of values, which include the value set by the user and exist in the predetermined numerical range, as the parameters to specify the numerical range of the parameter that is set while the numerical data in which the amount of difference with the sample data falls within the predetermined value. Then the numerical value is registered in the memory of the three-dimensional visual sensor. The numerical value is located at predetermined distances from the upper limit and lower limit of the numerical range.

The parameter set by the user is not always the optimum parameter, but the parameter close to the improper value is possibly set. However, in the above-described method, the numerical data indicating the recognition result is set to the sample data, after the results of the three-dimensional measurement and the recognition processing with the setting parameter are displayed to cause the user to confirm that the recognition result is proper. Therefore, the numerical range specified in the second step can be set to the value of the parameter with which the proper recognition result similar to that of the sample data is obtained.

Accordingly, the parameter range suitable to the recognition processing can be specified irrespective of the variation of the setting performed by the user. In the specified range, the value close to the numerical value not suited for the recognition can be prevented from being registered as the parameter by registering the value located at sufficient distances from the upper limit and lower limit of the numerical range. Accordingly, the three-dimensional measurement can stably be performed using the registered parameter, and therefore reliability of the numerical data outputted as the recognition result can be secured.

In a preferred aspect of the above-described method, preferably, in the first step, predetermined values are set to a plurality of parameters expressing measurement conditions of the three-dimensional measurement, three-dimensional measurement and recognition processing are performed to the real model image, and information indicating a recognition result is displayed. In the second step, a numerical range of the parameter, which is set while numerical data in which an amount of difference with sample data falls within the predetermined value in each parameter, is specified by performing the step A and the step B in a plurality of cycles, numerical data indicating the recognition result being set to the sample data in the step A in response to the manipulation of adopting the displayed recognition result is performed, a predetermined numerical range including the setting value in the first step being set to each of the plurality of parameters in the step A, a combination of parameter setting values being changed every time within the numerical ranges in the step A, the three-dimensional measurement being performed using the real model image based on the combination of parameter setting in the step A, the recognition processing being performed based on the three-dimensional measurement result of the step A to check numerical data indicating the recognition result with the sample data in the step B, and the third step is performed in each specified numerical range.

According to the above aspect, even if a need for setting the plurality of parameters expressing the measurement conditions arises, each parameter having a suitable value can be registered in the three-dimensional visual sensor.

In another preferred aspect of the above-described method, preferably processing for computing a coordinate expressing a position of the recognition-target object and a rotation angle of the recognition-target object with respect to a previously registered three-dimensional model of the recognition-target object as the numerical data is performed as the recognition processing by checking three-dimensional information restored by three-dimensional measurement with the three-dimensional model. In this case, the first step performs a step of performing the recognition processing to the three-dimensional information that is restored by the three-dimensional measurement processing using the real model image, a step of performing coordinate transformation to the three-dimensional model of the recognition-target object based on the coordinate and rotation angle computed by the recognition processing, and a step of performing perspective transformation of the coordinate-transformed three-dimensional model into a coordinate system of the imaging unit to superimpose a projection image of the three-dimensional model produced by the perspective transformation on the real model image are performed.

According to the above aspect, the perspective transformation of the three-dimensional model into the coordinate system of the imaging unit is performed based on the position and rotation angle, which are recognized in the real model, and the projection image of the three-dimensional model produced by the perspective transformation is displayed while superimposed on the image of the real model, so that the user can easily determine the accuracy of recognition result from the degree of coincidence of each displayed image.

In accordance with another aspect of the present invention, a three-dimensional visual sensor according to the present invention includes: an imaging unit that images a recognition-target object; a recognition processing unit that performs three-dimensional measurement using an image of the recognition-target object produced by the imaging unit and performs predetermined recognition processing based on a three-dimensional measurement result to output a recognition result as numerical data; and a registration processing unit that registers a parameter expressing a measurement condition in performing the three-dimensional measurement in the recognition processing unit. In addition, the three-dimensional visual sensor includes: a setting receiving unit, a tentative recognition performing unit, a sample data setting unit, a numerical range specifying unit, and a registration value specifying unit, which will be described below.

The setting receiving unit receives a manipulation of setting a value of the parameter. The tentative recognition performing unit provides the parameter setting value received by the setting receiving unit to the recognition processing unit, performs three-dimensional measurement and recognition processing based on the measurement result of the three-dimensional measurement, and displays information indicating the recognition result on a monitor device, the three-dimensional measurement being aimed at a real model image of the target object produced by the imaging unit. The sample data setting unit receives a manipulation of adopting the recognition result displayed by the tentative recognition performing unit and sets numerical data indicating the recognition result as sample data.

The numerical range specifying unit specifies a numerical range of the parameter, which is set while numerical data in which an amount of difference with the sample data falls within a predetermined value, by performing a step A and a step B in a plurality of cycles, the setting value of the parameter being changed every time within a predetermined numerical range including the parameter value set in obtaining the recognition result set to the sample data in the step A, the three-dimensional measurement being performed by the set parameter using the real model image in the step A, recognition processing being performed based on the three-dimensional measurement result of the step A to check numerical data indicating the recognition result with the sample data in the step B. A registration value specifying unit specifies a numerical value as a parameter registered in the recognition processing unit, the numerical value being located at predetermined distances from an upper limit and a lower limit of the numerical range specified by the numerical range specifying unit.

With the above-described configuration, the parameter is set to image the real model such that the user can obtain the proper recognition result concerning the real model of the recognition-target object. Therefore, the first step, the second step, and the third step are performed, and the parameter having the value suitable to perform the stable recognition processing can be registered in the recognition processing unit.

In the three-dimensional visual sensor described above, desirably a stereo camera including a plurality of cameras is used as the imaging unit, and the measurement unit is configured to perform the three-dimensional measurement using a stereo image produced by the stereo camera. However, the configuration is not limited thereto. For example, the imaging unit may include one camera to perform the three-dimensional measurement using the image that is produced under scanning of slit light or spot light.

In the above method for setting the parameter for three-dimensional measurement processing and the three-dimensional visual sensor, the value suitable to correctly recognize the recognition-target object can easily be set to secure the stable output for the parameter expressing the measurement condition of the three-dimensional measurement. Additionally, the parameter having the suitable value is automatically derived and registered, so that the user-friendliness of the three-dimensional visual sensor can be improved without putting a burden on the user.

DETAILED DESCRIPTION

Figure 1:
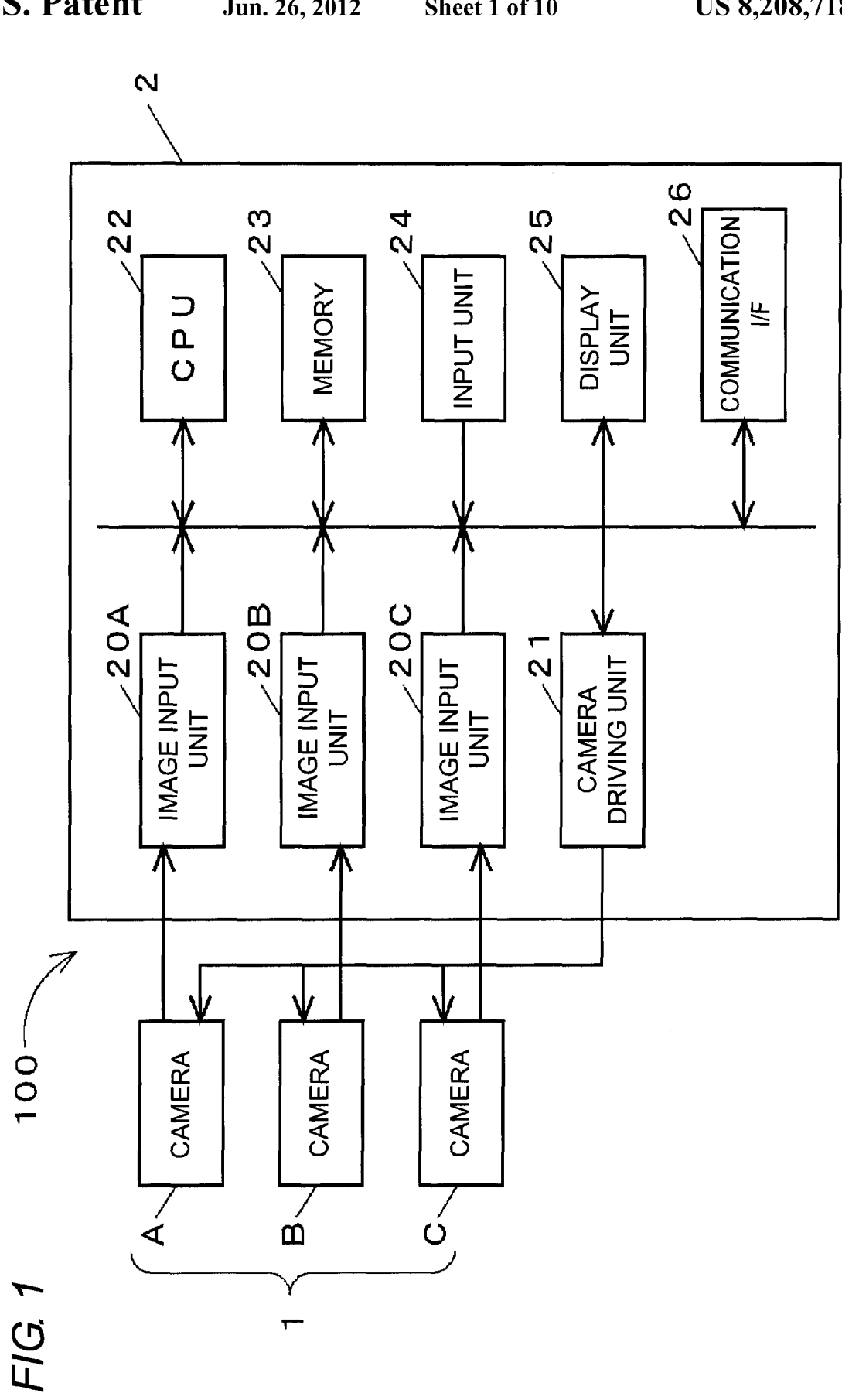
FIG. 1 is a block diagram illustrating an electric configuration of a three-dimensional visual sensor according to an embodiment of the invention.

FIG. 1 is a block diagram illustrating a configuration of a three-dimensional visual sensor.

A three-dimensional visual sensor 100 includes three cameras A, B, and C constituting a stereo camera and a recognition processing device 2. The recognition processing device 2 is a personal computer in which a dedicated program is stored. In the recognition processing device 2, after three-dimensional information on an edge is obtained by stereo measurement of the edges in the images produced by the cameras A, B, and C, the three-dimensional information is checked with a previously-registered three-dimensional model to recognize a position and an attitude of a workpiece.

Specifically the recognition processing device 2 includes image input units 20A, 20B, and 20C corresponding to the cameras A, B, and C, a camera driving unit 21, a CPU 22, a memory 23, an input unit 24, a display unit 25, and a communication interface 26.

The camera driving unit 21 simultaneously drives the cameras A, B, and C in response to a command provided from the CPU 22. Therefore, the images produced by the cameras A, B, and C are inputted to the CPU 22 through the image input units 20A, 20B, and 20C.

The display unit 25 is a monitor device including a liquid crystal panel, and the input unit 24 includes a keyboard and a mouse. In performing calibration processing, or in setting a parameter, the input unit 24 and the display unit 25 are used to input the setting information and to display information for assisting work. The communication interface 26 is used to conduct communication with an external device.

The memory 23 includes a large-capacity memory such as a ROM, RAM, and a hard disk. A program concerning recognition processing including the three-dimensional measurement and a program concerning various pieces of setting processing for the recognition processing are stored in the memory 23. In this embodiment, the three-dimensional information that is a recognition processing target is obtained by the measurement based on the segment based stereo method.

A camera parameter, a parameter (hereinafter referred to as "measurement parameter") expressing a measurement condition, and a three-dimensional model are also registered in the memory 23. The camera parameter expresses a relationship between a camera coordinate system of each of the cameras A, B, and C and a world coordinate system (specifically, 12 elements P00, P01, . . . , and P23 constituting a transformation matrix in the following equation (1)).

[Formula 1]

$$S\begin{pmatrix} x \\ y \\ 1 \end{pmatrix} = \begin{pmatrix} P_{00} & P_{01} & P_{02} & P_{03} \\ P_{10} & P_{11} & P_{12} & P_{13} \\ P_{20} & P_{21} & P_{22} & P_{23} \end{pmatrix} \begin{pmatrix} X \\ Y \\ Z \\ 1 \end{pmatrix} \quad (1)$$

The camera parameter is derived in each of the cameras A, B, and C by the calibration work in which a calibration plate is used, and a predetermined pattern is drawn in the calibration plate. After the camera parameter is registered, the measurement parameter and the three-dimensional model is set or produced using a real model image of the recognition-target object produced by each of the cameras A, B, and C (hereinafter the image produced by each camera is referred to as "model image" and an image produced by combining the three model images is referred to as "model stereo image").

An example in which the three-dimensional visual sensor 100 having the above-described configuration is used to recognize a position and an attitude of a component grasped by a picking robot in a factory will be described below.

Figure 2:
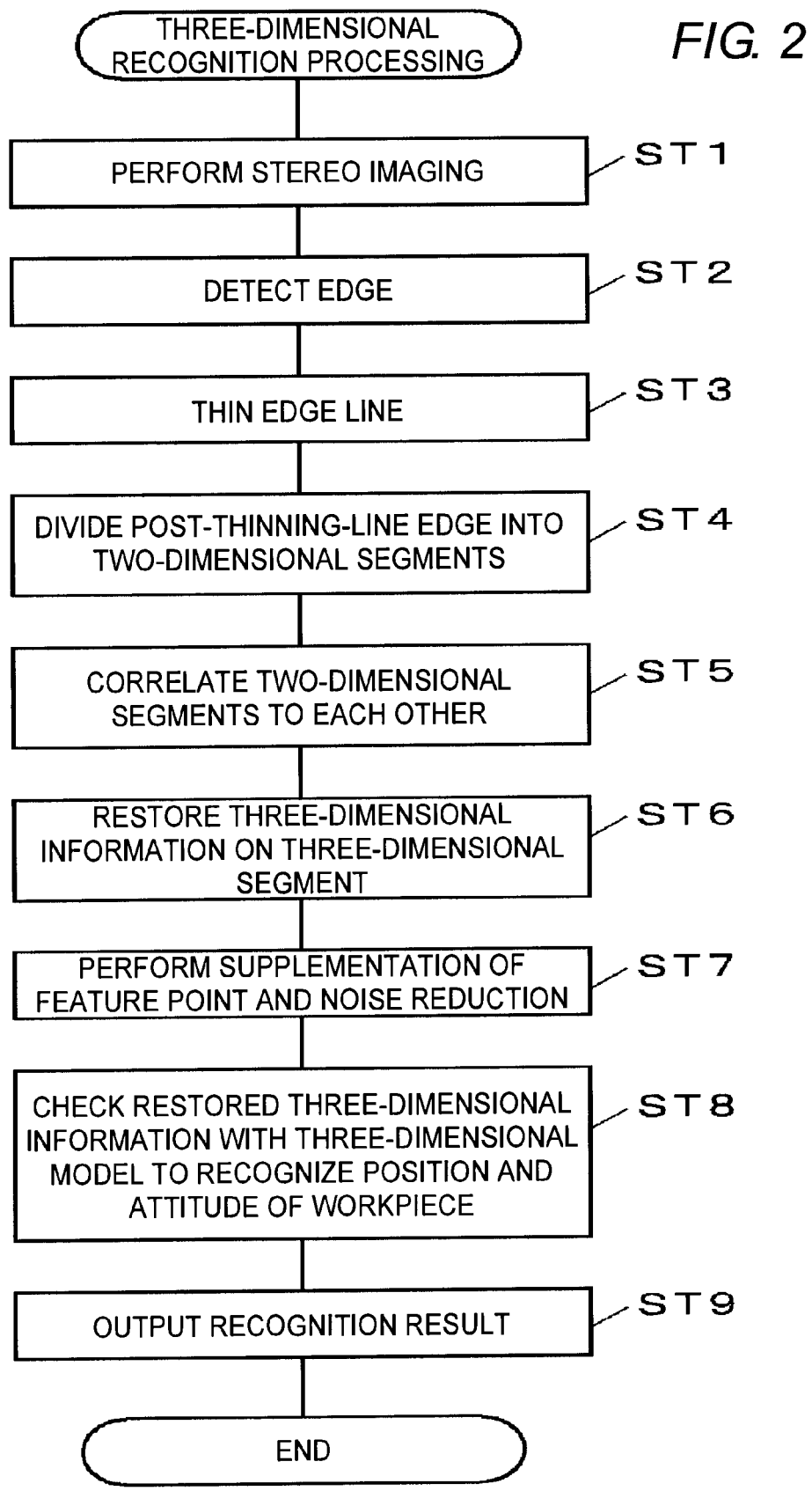
FIG. 2 is a flowchart illustrating a schematic procedure of recognition processing performed by the three-dimensional visual sensor of the embodiment.

FIG. 2 illustrates a schematic procedure of processing for recognizing a recognition-target object component (hereinafter referred to as "workpiece"). First, in the recognition processing, the stereo imaging is performed by the cameras A, B, and C (ST1).

The edge is detected from each produced image (ST2). Specifically, an edge extracting filter is applied to the processing target image, a density gradient strength is computed every pixel, and a pixel in which the computed density gradient strength is more than a predetermined threshold is detected as a constituent pixel of the edge.

The detected edge is thinned (data having one pixel width is formed), and the thinned edge is divided into straight-line or curved-line segments based on a connecting point or a branch point (ST3 and ST4). Hereinafter the segment extracted from the edge on the two-dimensional image is referred to as "two-dimensional segment".

Processing for correlating the two-dimensional segments having correspondence among the images is performed (ST5). Specifically, one of the three images is set to a reference image to sequentially focus on the two-dimensional segments of the reference image. Then, under the condition that the focused two-dimensional segment satisfies an epipolar condition and the condition that a connecting relationship with the close segment is matched with the focused two-dimensional segment, the two-dimensional segments satisfying the conditions are searched in other two images. When the two-dimensional segments satisfying the conditions are detected in the two images through the search processing, the detected two-dimensional segments are correlated to the focused two-dimensional segment.

The two-dimensional segment in which the correlation is not performed among the images is excluded from the object of the following processing.

When the above-described correlation processing is completed, three-dimensional information restoring processing is performed for every combination of the correlated two-dimensional segments in ST6. Hereinafter the two-dimensional segment expressed by the restored three-dimensional information is referred to as "three-dimensional segment".

The processing for restoring the three-dimensional information on one three-dimensional segment will be described.

The correlation is further performed in units of pixels among the correlated two-dimensional segments, and a three-dimensional coordinate is computed for every sets of correlated pixels. Assuming that the three-dimensional coordinate computed for every set expresses an arc, a radius of the arc is computed. When the radius is not lower than a predetermined threshold, a type of the three-dimensional segment in processing is set to a "straight line". On the other hand, when the radius of the arc is lower than the threshold, the type of the three-dimensional segment in processing is set to a "curved line".

The straight line or the curved line, which approximates a distribution pattern of the three-dimensional coordinates, is set based on the setting type, and the straight line or the curved line is sampled at previously-set intervals. The type (straight line or curved line) of the setting segment and the set of the three-dimensional coordinates of the sampling points are correlated to each other. Therefore, the three-dimensional segment is completed by the correlation.

When the three-dimensional information restoring processing is ended, feature point supplementation processing and noise reduction processing are performed in order to correct the restored three-dimensional information in ST7.

Figure 3:
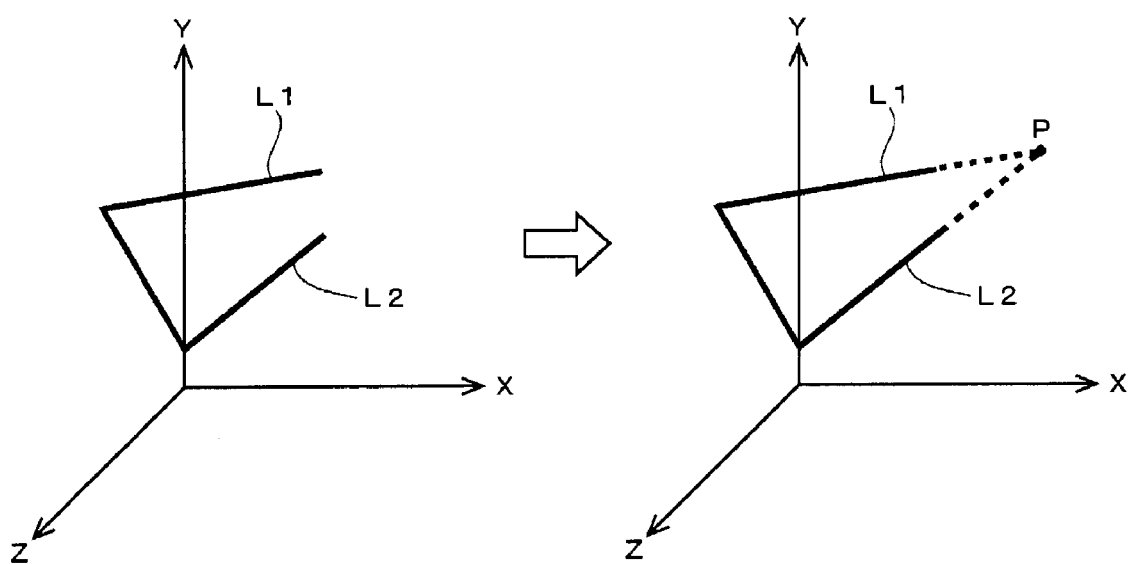
FIG. 3 illustrates processing for supplementing a feature point.

In the feature point supplementation processing, as illustrated in FIG. 3, the straight-line three-dimensional segments (three-dimensional segments L1 and L2 in this example) having end edges that are not connected to another three-dimensional segment are extended within a range of a predetermined upper limit. When the extended portion (for example, extended portion of segment L1) intersects the extended portion (for example, extended portion of segment L2) of another segment, an intersection point P of the extended portions is set to the feature point, and the three-dimensional coordinate of the feature point is computed.

In the feature point supplementation processing, the supplementation can be performed to three-dimensional coordinate of a vertex that does not exist in the restored three-dimensional information. In the three-dimensional recognition for the picking processing, because the recognition-target object is often bulk workpieces in which only some of the three-dimensional segments can be obtained, the feature point supplementation processing is useful to enhance the recognition accuracy.

However, when the supplementation processing is performed to the originally short three-dimensional segment, possibly the feature point is set to a site except the vertex. Therefore, in the noise reduction processing, the segment whose length is lower than a predetermined threshold before the segment is extended is removed from the segments to which the feature point supplementation processing is already performed. At the same time, the supplemented feature point is also removed.

Then the position and attitude of the workpiece are recognized by checking the corrected three-dimensional information with the previously-registered three-dimensional model (ST8). The processing will specifically be described below.

The three-dimensional model includes a plurality of three-dimensional segments expressing a whole contour shape of the workpiece and a coordinate of a representative point such as a gravity center. In ST8, the intersection point of the three-dimensional segments is set to the feature point, and a degree of coincidence of the checking target information to the three-dimensional model is computed while the feature point on the three-dimensional model side and the feature point in the three-dimensional information of the checking target are correlated in a round-robin way. It is assumed that the correlation is correct when the degree of coincidence exceeding a predetermined reference value is obtained. At this point, the degree of coincidence exceeding the predetermined reference value is stored, the coordinate correlated to the representative point of the three-dimensional model is specified as the position of the workpiece, and a rotation angle of the three-dimensional model is specified as the attitude of the workpiece.

When the recognition processing is ended, numerical data expressing the recognition result, that is, the coordinate expressing the position of the workpiece and the rotation angle expressing the attitude of the workpiece are outputted from the communication interface 26. The pieces of output data is provided to a robot controller (not illustrated) and used in operation control of the picking robot.

In ST8, when the plurality of correlations in which the degree of coincidence to the three-dimensional model exceeds the reference value are found, the coordinate and the rotation angle are specified for every correlation. Therefore, the plurality of workpieces can individually be recognized even if the stereo measurement is performed to the plurality of workpieces.

In order to secure the accuracy of the recognition processing, in addition to the registration of the accurate three-dimensional model, it is necessary to set a measurement parameter such that the three-dimensional information correctly reflecting the contour shape of the workpiece is restored. In the three-dimensional visual sensor of the present embodiment, after various measurement parameters are set according to the manual manipulation of the user, processing (hereinafter referred to as "parameter optimization processing") for adjusting each parameter to a more suitable value is performed using a stereo model image of the workpiece.

The parameter setting processing and parameter optimization processing, performed by the user, will be described below by taking a threshold of the density gradient strength used in the edge detection processing (ST2 of FIG. 3), an upper limit of the extended portion length in extending the three-dimensional segment for the feature point supplementation processing (ST7 of FIG. 3), and a maximum length of the three-dimensional segment that is a target of the noise reduction processing (ST7 of FIG. 3) as specific examples of the measurement parameter.

In this embodiment, the model image or stereo model image produced by imaging the real model (hereinafter referred to as "workpiece model") of the workpiece is processed based on the measurement parameters set by the user, the processing result is displayed on the display unit 25, and a manipulation of changing the parameter is received even if the processing result is in the display state. Therefore, the user adjusts the parameters until the proper processing result is displayed, which allows the user to restore the three-dimensional information suitable to the recognition of the workpiece.

Figure 4A:
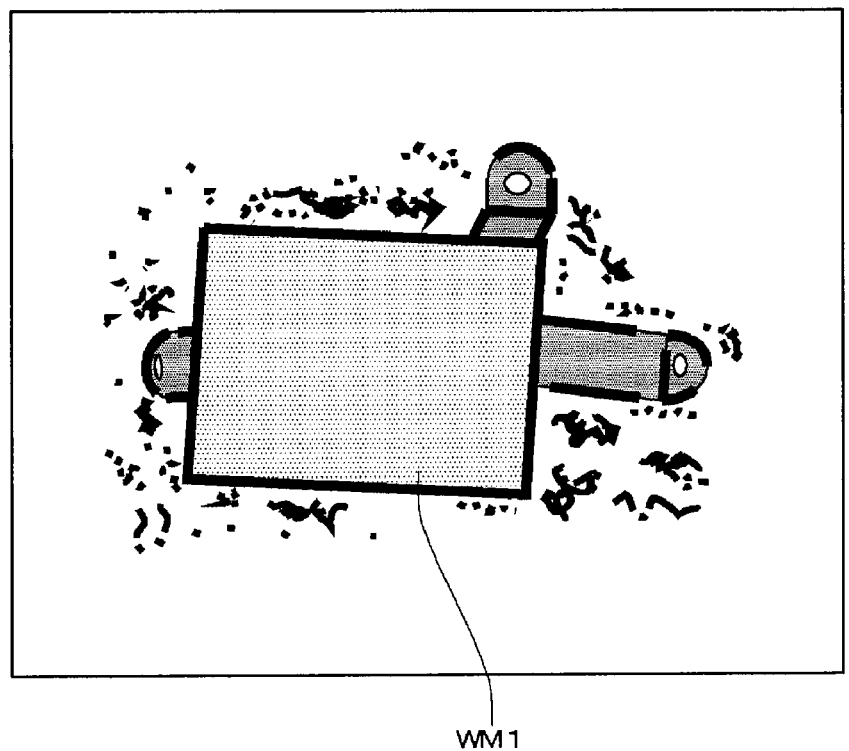
FIGS. 4A and 4B illustrate examples of images that are displayed in setting an edge level.
Figure 4B:
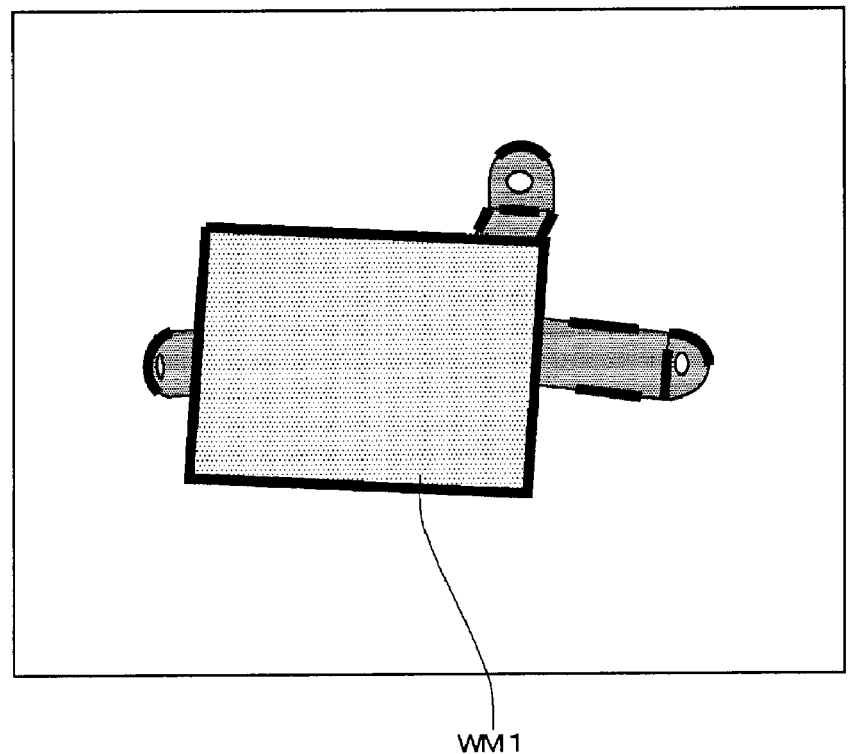

FIGS. 4A and 4B illustrate examples of displays in setting a threshold (hereinafter referred to as "edge level") of density gradient strength used in the edge detection processing.

In the display of FIG. 4, based on an edge level set by the user, the edge detected from the model image (produced by one of the cameras A, B, and C) produced by imaging a workpiece model WM1 is displayed as a line drawings (expressed by an extra-thick line in FIG. 4) in predetermined color while superimposed on the model image.

FIG. 4A illustrates a display example for the improper edge level. In FIG. 4A, many noise edges caused by surrounding shadows emerge in addition to the edge expressing the contour of the workpiece model WM1. On the other hand, in FIG. 4B, only the edge expressing a main part of the contour of the workpiece model WM1 is displayed while the noises are eliminated.

In the edge level setting work of this embodiment, after the edge level is set such that a certain level of noise is generated (FIG. 4A), the edge level is adjusted until the background noise is eliminated (FIG. 4B). The setting is performed in each of the model images produced by the cameras A, B, and C.

Figure 5:
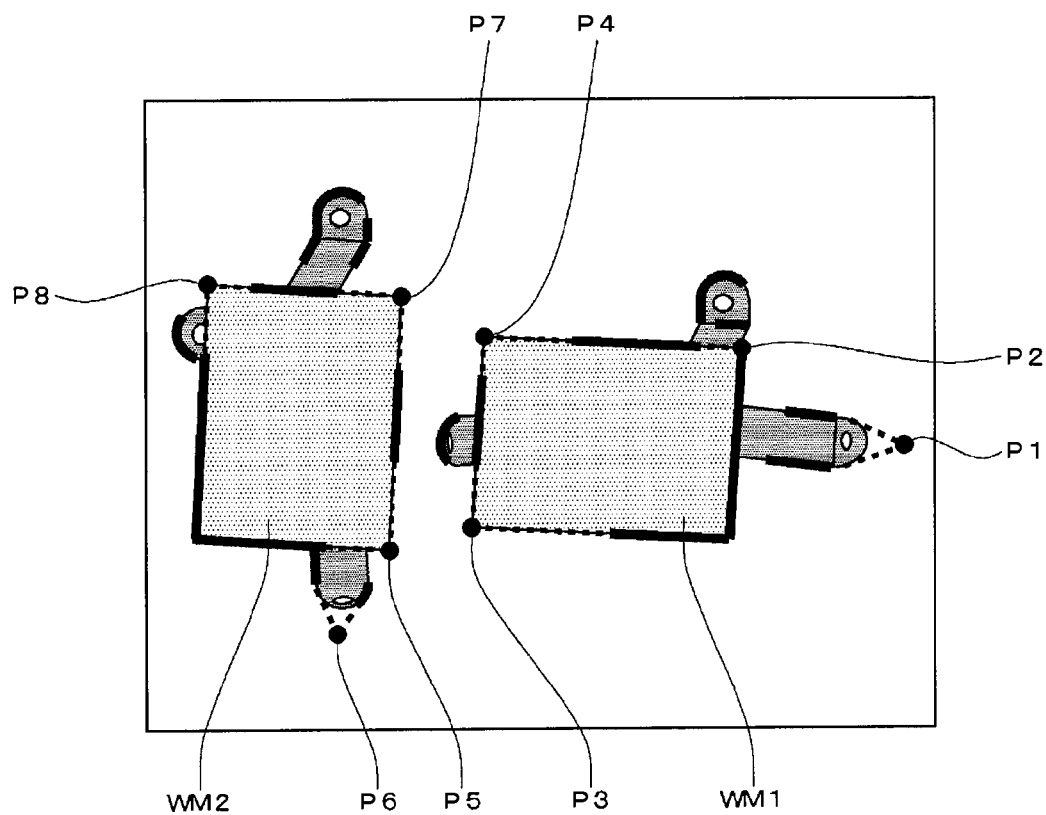
FIG. 5 illustrates an example of am images that is displayed in setting a vertex extraction level and a vertex removal level.

FIG. 5 illustrates a display example in setting the maximum length of the extended portion in the three-dimensional segment extending processing and the maximum length of the three-dimensional segment deleted as the noise. In view of the fact that the processing performed using the measurement parameters is aimed at the extraction of the vertex of the workpiece, the maximum length of the extended portion in the three-dimensional segment extending processing is referred to as "vertex extraction level", and the maximum length of the deleted three-dimensional segment is referred to as "vertex removal level".

In the display of FIG. 5, the line drawings expressing the edges and feature points P1 to P8 supplemented through the three-dimensional segment extending processing are superimposed on the model images of the two workpiece models WM1 and WM2 having the same shape. However, the edge of FIG. 8 differs from the edge of FIG. 4 in that the three-dimensional segment is expressed. That is, after the three-dimensional segment restored from the two-dimensional segment is processed by the vertex extraction level and the vertex removal level, and the perspective transformation of the processed three-dimensional segment into the camera coordinate system corresponding to the model image in the display is performed to produce a projection image. Similarly the feature points P are set based on the perspective transformation result of the three-dimensional coordinate. In the three-dimensional segments, the extended portion (portion indicated by broken-line) is expressed in a color different from that of the portion restored by the usual measurement.

The following equation (2) obtained by modifying the equation (1) (($P_{20}X+P_{21}Y+P_{22}Z+P_{23}$) in the equation (2) corresponds to S of the equation (1)) is used in the perspective transformation processing. That is, each three-dimensional coordinate of the three-dimensional segment is substituted for (X, Y, Z) to compute the equation (2), thereby obtaining the transformed coordinate (x, y).

[Formula 2]

$$\begin{pmatrix} x \\ y \end{pmatrix} = \frac{1}{P_{20}X + P_{21}Y + P_{22}Z + P_{23}} \begin{pmatrix} P_{00} & P_{01} & P_{02} & P_{03} \\ P_{10} & P_{11} & P_{12} & P_{13} \end{pmatrix} \begin{pmatrix} X \\ Y \\ Z \\ 1 \end{pmatrix} \quad (2)$$

Therefore, when the vertex extraction level and the vertex removal level are properly set, the projection image of the three-dimensional segment is adapted to the contours of the workpiece models WM1 and WM2 in the image, and the feature points P1 to P8 becomes adapted to the vertexes of the workpiece models WM1 and WM2. Accordingly, the user adjusts the vertex extraction level and the vertex removal level until the good display state is obtained, which allows the user to set the parameters to values suitable to restore the accurate three-dimensional segment.

As described above, in this embodiment, the two-dimensional processing in which the model image is used or the three-dimensional processing in which the stereo model image is used is performed based on the measurement parameters set by the user, and the processing result is displayed while superimposed on the model image, so that the user having little experience can easily set the measurement parameters. In this embodiment, because the following parameter optimization processing is performed after the measurement parameters are set, even if the measurement parameter set by the user is a value close to a range not suited to the recognition, the value can be adjusted to a value suitable to perform the stable recognition processing.

Figure 6:
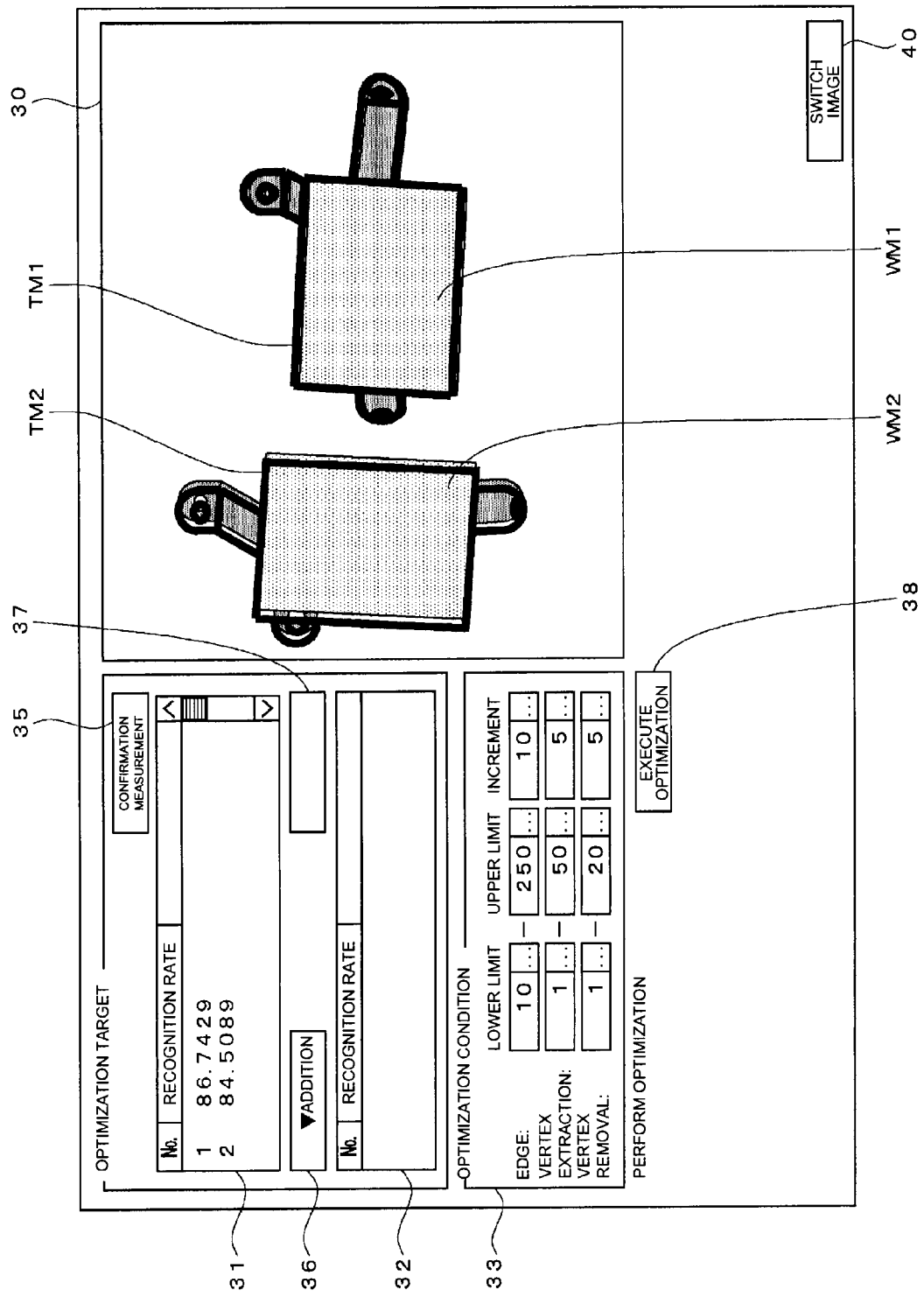
FIG. 6 illustrates an example of a work screen for processing for optimizing a measurement parameter.
Figure 7:
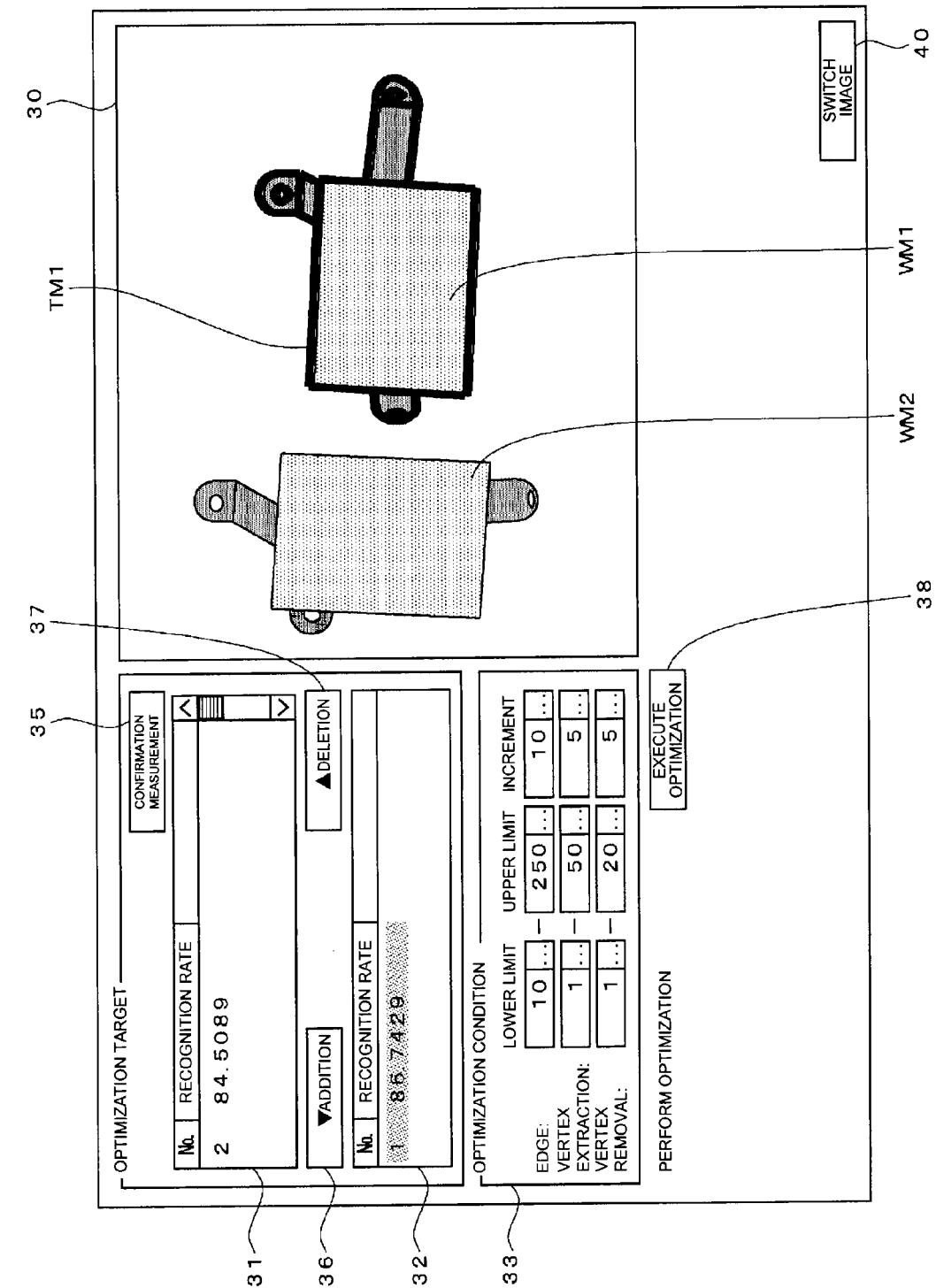
FIG. 7 illustrates the example of the work screen for the processing for optimizing the measurement parameter.
Figure 8:
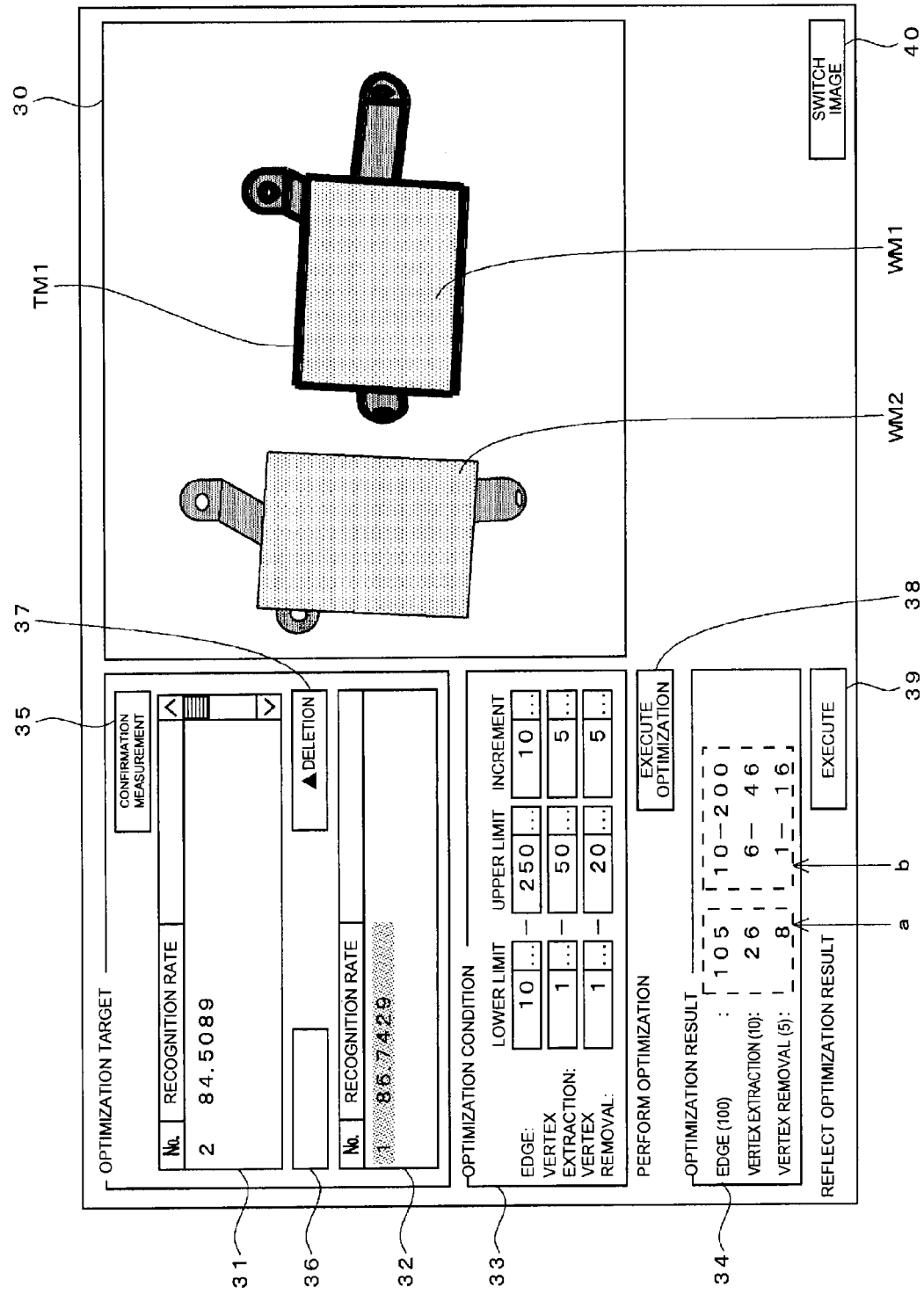
FIG. 8 illustrates the example of the work screen for the processing for optimizing the measurement parameter.

FIGS. 6 to 8 illustrate an example of a work screen that is started up on the display unit 25 in performing the processing for optimizing a measurement parameter.

The work screen is divided into right and left parts, an image display region 30 is provided on the right side, and regions 31 to 34 and manipulation buttons 35 to 39 are provided on the left side in order to display the information or perform the manipulation (however, the region 34 and the button 39 are illustrated only in FIG. 8).

The model image produced by one of the cameras A, B, and C is displayed in the image display region 30 (as with the example of FIG. 5, the two workpiece models WM1 and WM2 emerge in examples of FIGS. 6 to 8). The display in the image display region 30 can be switched to the display of the model image produced by another camera by manipulating the switching button 40 located on the lower right of the screen.

The displays in the regions 31 to 34 on the left side of the screen and valid/invalid states of the manipulation buttons 35 to 39 vary with progression of the processing. The items of "edge", "vertex extraction", and "vertex removal" in the regions 33 and 34 mean the edge level, the vertex extraction level, and the vertex removal level, respectively.

Figure 9:
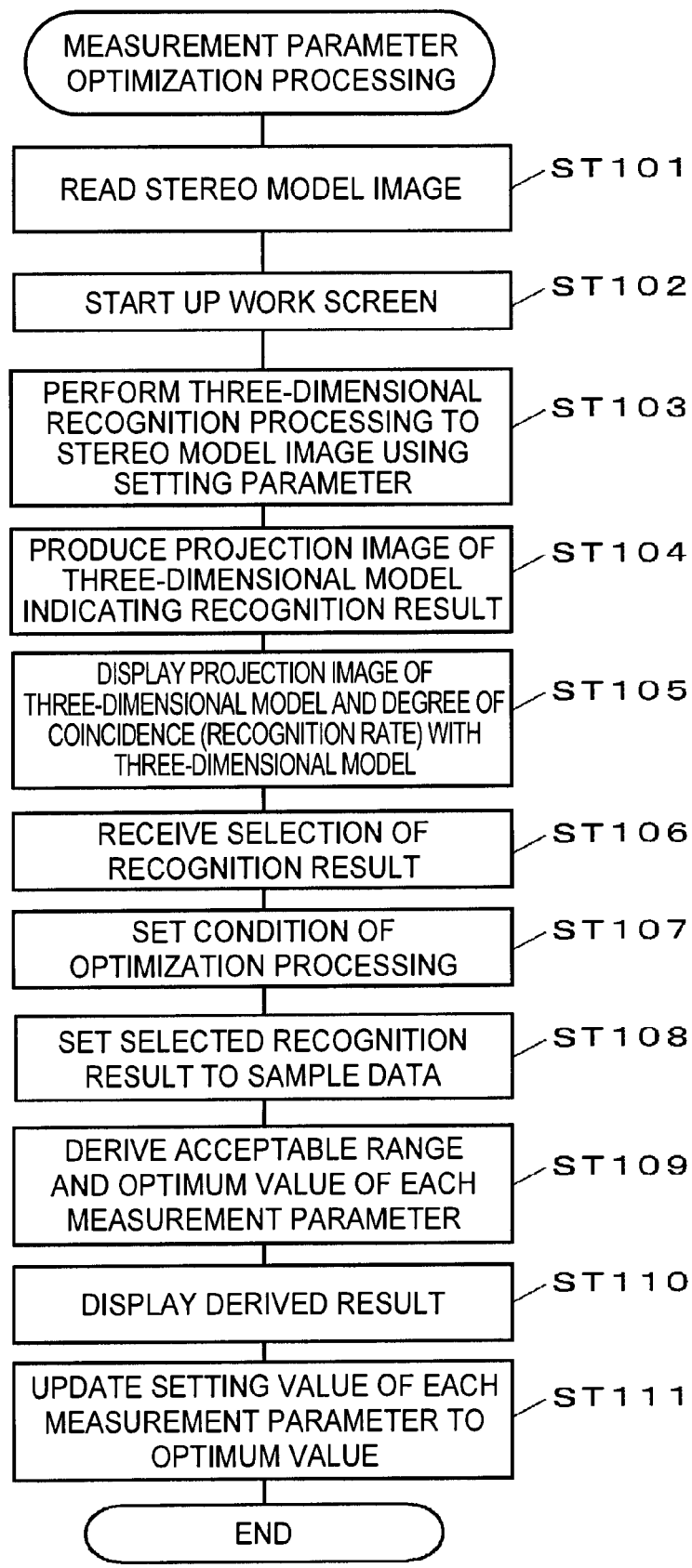
FIG. 9 is a flowchart illustrating a procedure of the processing for optimizing the measurement parameter.

The optimization processing of this embodiment is performed in a procedure of FIG. 9 while subjected to the user's manipulation on the work screen.

Pieces of processing (ST101 to ST111) illustrated in a flowchart of FIG. 9 will be described in detail with reference to FIGS. 6 to 8.

In this procedure, the stereo model images that are processing targets are read, the work screen is started up, and one of the read stereo model images is disposed on the image display region 30 (ST101 and ST102). Note that the region 34 is not set on the work screen at this stage, and the regions 31, 32, and 33 are set to a blank state.

In this state, when the user manipulates the "confirmation measurement" button 35 on the screen, the three-dimensional recognition processing is performed to the stereo model image read in ST101 using the measurement parameters set by the user (ST103). Although the three-dimensional recognition processing is performed according to the procedure of FIG. 2, the last recognition result output (ST9 of FIG. 2) is not performed, but steps ST104 and ST105 are performed instead.

In ST104, the projection image indicating the recognition result is produced through the three-dimensional recognition processing by performing the two-stage transformation processing to the three-dimensional model registered in the memory 23.

Specifically, the coordinate transformation of the registered three-dimensional model is performed based on the coordinate that is recognized as the position of the workpiece model and the angle that is recognized as the attitude of the workpiece model, thereby conforming the position and attitude of the three-dimensional model with the recognition result.

Then, the perspective transformation of the coordinate-transformed three-dimensional model into the coordinate system of the camera corresponding to the model image displayed in the image display region 30 is performed. In this perspective transformation processing, the equation (2) as in the example of FIG. 5 is used.

The projection image production processing is performed for every point (point at which the degree of coincidence to the three-dimensional model exceeding the reference value) correlated with the three-dimensional model, that is, for every recognized workpiece model. In ST105, the projection images are displayed on the work screen along with the degree of coincidence to the three-dimensional model of each workpiece model. FIG. 6 illustrates this display state.

Referring to FIG. 6, projection images TM1 and TM2 of the three-dimensional model are displayed while superimposed on the model image in the image display region 30. The projection images TM1 and TM2 indicate the recognition results concerning the workpiece models WM1 and WM2, respectively. In the region 31 on the left side of the screen, the degrees of coincidence (degree of coincidence is expressed in terms of "recognition rate" in the work screen of this example) to the three-dimensional model are displayed in a descending order for every point correlated to the three-dimensional model.

The numerical display of the degree of coincidence in the region 31 is used not only to cause the user to confirm the recognition accuracy but also to cause the user to select the specific recognition result indicated by the projection images TM1 and TM2 in the image display region 30. That is, when the user selects the predetermined numerical display point in the region 31 by a click manipulation, only the projection image (projection image TM1 in the illustrated example) corresponding to the selected point is displayed in the image display region 30. Therefore, the user can confirm the recognition accuracy to each workpiece model WM.

When the user manipulates the "addition" button 36 after selecting the recognition result, processing (ST106 of FIG. 9) for receiving the manipulation is performed, and the numerical display corresponding to the selected recognition result (in this example, the recognition result corresponding to the workpiece model WM1) is moved into the region 32 as illustrated in FIG. 7.

At this point, one recognition result is not always selected, but a plurality of recognition results may be selected. When the recognition result is selected, the "deletion" button 37 located on the right side of the button 36 is activated, and the selection can be cancelled by manipulating the button 37.

The region 33 is used to set the optimization processing condition, and an input box (not labeled) is provided in order to set the lower limit, the upper limit, and the variation width (increment) in each of the measurement parameters of the edge level, vertex extraction level, and vertex removal level. A numerical range having a predetermined range including the numerical value set by the user is displayed in each input box based on a default setting. The user can freely change each value.

The condition set to each measurement parameter means that the setting value of the measurement parameter is changed by the variation width within the range from the lower limit to the upper limit.

In ST107, in response to the manipulation of the "optimization performance" button 38, the optimization processing condition is set based on setting contents in the region 33. In ST108, after the selected recognition result (coordinate and angle) is set to the sample data, the three-dimensional recognition processing in which the stereo model image is used and the processing for checking the recognition result with the sample data are repeated while the combination of the measurement parameter values is changed every time based on the setting condition. Finally, the setting value range (hereinafter referred to as "acceptable range") where the good recognition result is obtained is determined for every measurement parameter, and one of the numerical values in the acceptable range is set to an optimum value of the parameter.

In ST109, each derived acceptable range and each optimum value are then displayed on the work screen. FIG. 8 illustrates the display at this point. The region 34 and the "execute" button 39 are further provided below the button 38.

The processing result is displayed for every three kinds of measurement parameters in the region 34. In FIG. 8, the acceptable range of each measurement parameter is displayed in a frame indicated by an arrow b. In a frame indicated by an arrow a, the numerical value in the intermediate position of the acceptable range is displayed as the optimum value of each measurement parameter. The numerical value in the parenthesis on the left side is the parameter set by the user.

At this point, when the user manipulates the "execute" button 39, the flow goes to ST111 of FIG. 9, and each measurement parameter is updated to the optimum value displayed in the column a. Each optimum value corresponds to the intermediate position in the numerical range that is specified as the acceptable range of the measurement parameter, so that the stable measurement can be performed using the set measurement parameters even if the stereo image produced through the processing has a slight variation. Therefore, high-reliability numerical data (coordinate and angle) can be outputted as the recognition result.

The processing for deriving the acceptable range and optimum value of each measurement parameter will specifically be described below.

Figure 10:
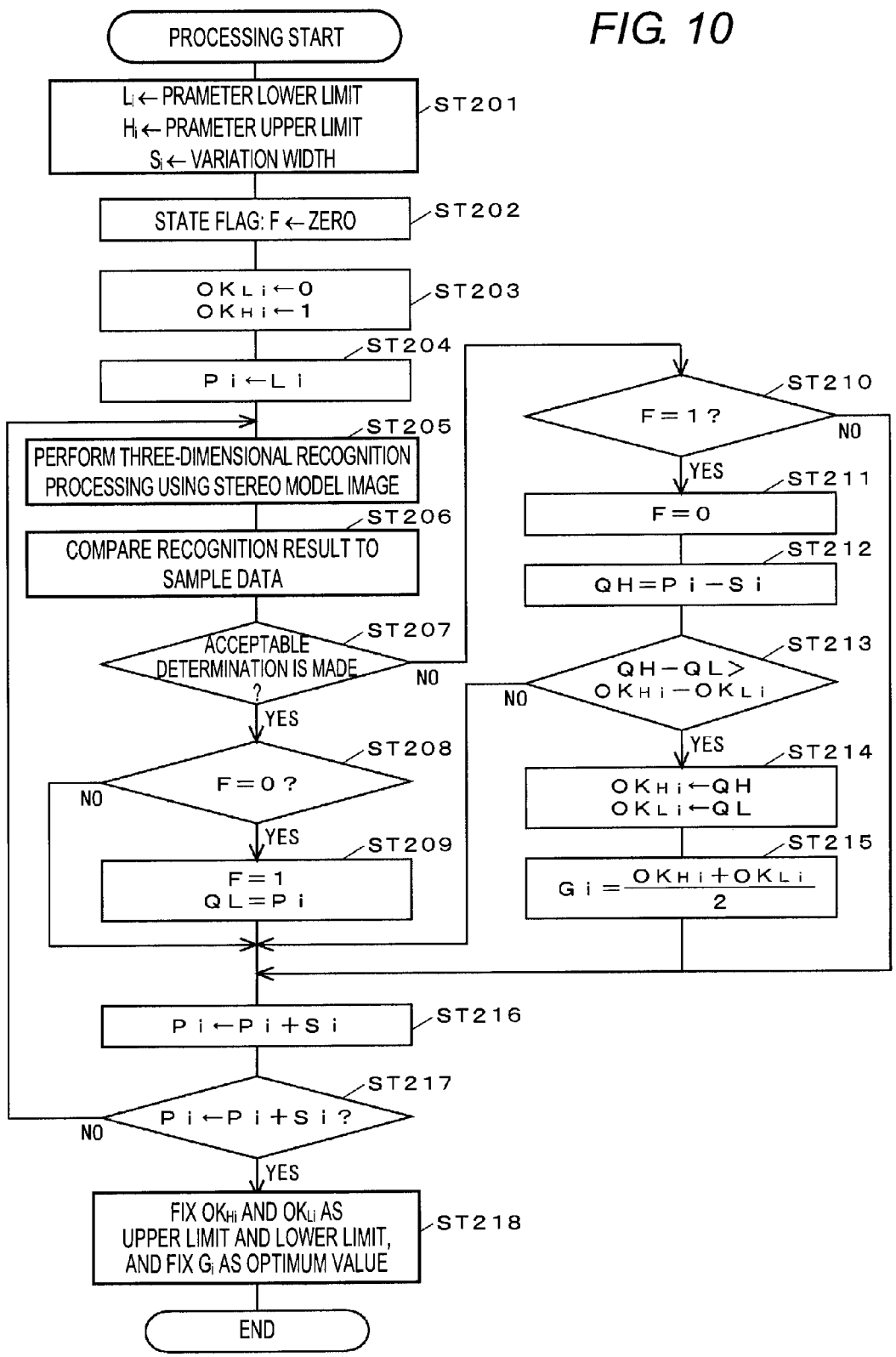
FIG. 10 is a flowchart illustrating a procedure of processing for deriving an acceptable range and an optimum value of the measurement parameter.

The processing is started while the lower limits are set to three kinds of measurement parameters of the processing target, and attention is sequentially paid to the measurement parameters to perform processing of FIG. 10 to each measurement parameter.

The suffix i of each of variables $L_i$, $H_i$, $S_i$, $OK_{Hi}$, and $OK_{Li}$ in the flowchart of FIG. 10 is an argument indicating a type of the parameter. For example, i=0 corresponds to the edge level, i=1 corresponds to the vertex extraction level, and i=2 corresponds to the vertex removal level.

Assuming that attention is paid to the first measurement parameter (for example, edge level), the procedure of FIG. 10 will be described below.

The parameter lower limit is set to the variable $L_i$, the parameter upper limit is set to the variable $H_i$, and the variation width is set to the variable $S_i$ (ST201). In the initial setting, a state flag F is set to zero (ST202), the lower limit $OK_{Li}$ of the acceptable range is set to zero, and the upper limit $OK_{Hi}$ is set to 1 (ST203). The lower limit $L_i$ is set as the initial value to the focused parameter $P_i$ (ST204).

Then the flow enters a loop of ST205 to ST217. In the loop, while the parameter $P_i$ is changed by $S_i$ from the initial value $L_i$ to the upper limit $H_i$, the three-dimensional recognition processing is performed to the stereo model image based on the currently-set parameter $P_i$ (ST205).

The three-dimensional recognition processing is performed in the procedure similar to that of FIG. 2 except that the recognition result is not outputted. In the three-dimensional recognition processing, the value of the measurement parameter (vertex extraction level and vertex removal level) to which attention is not paid is set to the lower limit.

When the three-dimensional recognition processing is ended, the recognition result closest to the sample data is selected, an amount of difference with the sample data (absolute value or square value of difference with sample data) is determined in each of the coordinate data and the angle data, and each difference amount is compared with a predetermined threshold (ST206). When both of the difference amounts are equal to or lower than the threshold, the current parameter $P_i$ is determined to be "acceptable". On the other hand, when one or both of the difference amounts are more than the threshold, the current parameter $P_i$ is determined to be "defective".

The state flag F is used to store the determination result in the preceding stage, and F=0 means that the determination in the preceding stage is defective. When the parameter $P_i$ is continuously determined to be defective for a while from the beginning of the loop, it is determined as "NO" in ST207 and ST210, and only the value $P_i$ is updated (ST216).

When the parameter $P_i$ is determined to be acceptable at a predetermined time, it is determined as "YES" in ST207, and it is determined as "NO" in ST208. In this case, the flow goes to ST209, the state flag F is changed to 1, the current value $P_i$ is set to the variable QL, and then the value $P_i$ is updated (ST216).

When the updated parameter $P_i$ is continuously determined to be acceptable, it is determined as "YES" in ST207, and it is determined as "NO" in ST208. Therefore, the state where the state flag F is 1 is maintained.

When the determination of the parameter $P_i$ is changed to be defective at a predetermined time, it is determined as "NO" in ST207, and it is determined as "YES" in ST210. Therefore, the state flag F is changed to zero (ST211). A value in which the variation width $S_i$ is subtracted from the current parameter $P_i$ is set to a variable QH (ST212).

A difference (QH−QL) between the variable QH and the variable QL set in ST209 is compared to a value ($OK_{Hi}$−$OK_{Li}$) (ST213). When the difference (QH−QL) is more than the value ($OK_{Hi}$−$OK_{Li}$), the flow goes to ST214, the variable $OK_{Hi}$ is rewritten by the value QH, and the variable $OK_{Li}$ is rewritten by the value QL. In ST215, an intermediate value $G_i$ between the updated variables $OK_{Hi}$ and $OK_{Li}$ is computed.

When the determination processing in ST213 is initially performed, the value ($OK_{Hi}$−$OK_{Li}$) is 1 because the variables $OK_{Hi}$ and $OK_{Li}$ remain in the values set in ST203. Therefore, in most cases, it is determined as "YES" in ST213, and the pieces of processing in ST214 and ST215 are performed.

When the parameter $P_i$ is continuously determined to be defective until the parameter $P_i$ reaches the upper limit $H_i$, the values of the variables $OK_{Li}$, $OK_{Hi}$, and $G_i$ are fixed by the end of the loop ("YES" in ST217).

On the other hand, when the determination is changed from defective to acceptable, it is determined as "YES" in ST207 and ST208. The flow goes to ST209, the state flag F is changed to 1, the variable QL is updated to the current value of the parameter $P_i$. Thereafter, while the parameter $P_i$ is determined to be acceptable, it is determined as "YES" in ST207, and it is determined as "NO" in ST208. Therefore, only the parameter $P_i$ is updated (ST216).

When the determination of the parameter $P_1$ is changed to be defective at a predetermined time, it is determined as "NO" in ST207, and it is determined as "YES" in ST210. Therefore, the state flag F is set to zero (ST211), and the variable QH is updated to the value in which the variation width $S_i$ is subtracted from the current parameter $P_i$ (ST214).

The determination in ST213 is made again. When the difference (QH−QL) is more than the value ($OK_{Hi}$−$OK_{Li}$), the variables $OK_{Hi}$ and $OK_{Li}$ are rewritten by the values QH and QL (ST214), and the value $G_i$ is updated (ST217). On the other hand, when (QH−QL)≧($OK_{Hi}$−$OK_{Li}$), ST214 and ST215 are not performed, and the values $OK_{Hi}$, $OK_{Li}$, and $G_i$ are maintained.

Similarly, when the parameter $P_i$ updated in ST216 exceeds the upper limit $H_i$, the loop of ST205 to ST217 is ended, the variables $OK_{Hi}$ and $OK_{Li}$ at this point are fixed as the upper limit and lower limit of the acceptable range, and the value $G_i$ is fixed as the optimum value (ST218). Although not illustrated in FIG. 10, when the state flag F is set to zero at the end of the loop, the procedure similar to that of ST212 to ST215 is performed, and the fixing processing in ST218 is performed based on the processing result.

As described above, in this embodiment, the processing in ST205 and the processing in ST206 are repeatedly performed. The parameter $P_i$ is changed every time based on the setting condition to perform the processing executing the three-dimensional recognition (ST205), and the processing comparing the recognition result corresponding to the sample data with the sample data (ST206). Therefore, the setting range (acceptable range) where the proper recognition result can be obtained is specified with respect to the parameter $P_i$, and the value existing in the intermediate position of the range is set to the proper value. When the plurality of ranges where acceptable determination is obtained are detected in the numerical range set in the parameter $P_i$, the numerical range having the largest numerical width is specified as the acceptable range through the pieces of processing ST213, ST214, and ST215, thereby obtaining the proper value.

The recognition result in which the sufficient accuracy is secured by the displays of FIGS. 6 to 8 is selected to set the sample data. Therefore, the value in the intermediate position of the numerical range of the parameter $P_i$ that is set while the recognition result approximated to the sample data is obtained is set to the proper value, so that measurement processing suitable to recognize the workpiece can stably be performed.

The acceptable range and the proper value can be obtained in the similar procedure for the second and third measurement parameters. In such cases, for the parameter whose proper value $G_i$ is fixed, the proper value $G_i$ is set to perform the three-dimensional recognition processing.

The optimum value of the measurement parameter is not limited to the value of the intermediate position of the acceptable range, but it is only necessary to set a value sufficiently distant from the upper limit and lower limit of the acceptable range. Therefore, for example, a value slightly smaller than that of the intermediate position of the acceptable range may be set to the setting value with respect to the edge level, and a value slightly larger than that of the intermediate position of the acceptable range may be set to the setting value with respect to the vertex extraction level.

In addition to the three kinds of measurement parameters, the optimum value of the measurement parameter can be determined in the similar way with respect to an interval between the sampling points in producing the three-dimensional segment and a numerical value (for example, a maximum curvature of the curved-line segment) indicating a reference of processing for determining the type of the segment.

In the three-dimensional visual sensor 100 of the above-described embodiment, the three-dimensional information on the edge of the workpiece W is obtained by the stereo measurement using the plurality of cameras A, B, and C. Alternatively, for example, the parameter expressing the measurement condition can be set in the way similar to that of the above-described embodiment using a device, in which the imaging is performed with one camera while the workpiece is scanned with slit light or spot light and the three-dimensional information on the workpiece is restored by the two-dimensional image processing.

Moreover, in a case where the three-dimensional coordinate of the height or representative point of the workpiece is outputted from the three-dimensional visual sensor 100, or a case where the degree of coincidence to the three-dimensional model is outputted from the three-dimensional visual sensor 100, the numerical range of the measurement parameter that is set while the proper numerical data is obtained is specified by the technique similar to that of the above-described embodiment, and the optimum measurement parameter can be specified therefrom.

What is claimed is:

1. A method for deriving a parameter for three-dimensional measurement processing, in which the parameter expressing a measurement condition of three-dimensional measurement is set to a three-dimensional visual sensor such that the three-dimensional visual sensor outputs numerical data indicating a recognition result concerning a predetermined recognition-target object, the three-dimensional visual sensor imaging the recognition-target object with an imaging unit, the three-dimensional visual sensor performing three-dimensional measurement using a recognition-target object image produced by the imaging, the three-dimensional visual sensor performing predetermined recognition processing based on a three-dimensional measurement result to output the recognition result as numerical data, the method comprising:
   a first step of performing, by one or more computers, processing for imaging a real model of the recognition-target object with the imaging unit and processing for receiving a manipulation of setting the parameter to a predetermined value, performing the three-dimensional measurement and the recognition processing based on the parameter of the received setting value using the real model image produced by the imaging, and displaying information indicating a recognition result of the recognition processing;
   a second step of specifying, by the one or more computers, a numerical range of the parameter, which is set while numerical data in which an amount of difference with sample data falls within a predetermined value, by performing a step A and a step B in a plurality of cycles, numerical data indicating the recognition result being set to the sample data in the step A when a manipulation of adopting the displayed recognition result is performed, the setting value of the parameter being changed every time within a predetermined numerical range including the parameter value set in the first step in the step A, the three-dimensional measurement being performed by the set parameter using the real model image in the step A, recognition processing being performed based on the three-dimensional measurement result of the step A to check numerical data indicating the recognition result with the sample data in the step B; and
   a third step of registering, by the one or more computers, a numerical value in a memory of the three-dimensional visual sensor, the numerical value being located at predetermined distances from an upper limit and a lower limit of the numerical range specified in the second step.

2. The method according to claim 1, wherein,
   in the first step, predetermined values are set to a plurality of parameters expressing measurement conditions of the three-dimensional measurement, three-dimensional measurement and recognition processing are performed to the real model image, and information indicating a recognition result is displayed,
   in the second step, a numerical range of the parameter, which is set while numerical data in which an amount of difference with sample data falls within the predetermined value in each parameter, is specified by performing the step A and the step B in a plurality of cycles, numerical data indicating the recognition result being set to the sample data in the step A in response to the manipulation of adopting the displayed recognition result is performed, a predetermined numerical range including the setting value in the first step being set to each of the plurality of parameters in the step A, a combination of parameter setting values being changed every time within the numerical ranges in the step A, the three-dimensional measurement being performed using the real model image based on the combination of parameter setting in the step A, the recognition processing being performed based on the three-dimensional measurement result of the step A to check numerical data indicating the recognition result with the sample data in the step B, and
   the third step is performed in each specified numerical range.

3. The method according to claim 1, wherein processing for computing a coordinate expressing a position of the recognition-target object and a rotation angle of the recognition-target object with respect to a previously registered three-dimensional model of the recognition-target object as the numerical data is performed as the recognition processing by checking three-dimensional information restored by three-dimensional measurement with the three-dimensional model, and
- a step of performing the recognition processing to the three-dimensional information that is restored by the three-dimensional measurement processing using the real model image, a step of performing coordinate transformation to the three-dimensional model of the recognition-target object based on the coordinate and rotation angle computed by the recognition processing, and a step of performing perspective transformation of the coordinate-transformed three-dimensional model into a coordinate system of the imaging unit to superimpose a projection image of the three-dimensional model produced by the perspective transformation on the real model image are performed in the first step.

4. A three-dimensional visual sensor comprising:

an imaging unit that images a recognition-target object;

a recognition processing unit that performs three-dimensional measurement using an image of the recognition-target object produced by the imaging unit and performs predetermined recognition processing based on a three-dimensional measurement result to output a recognition result as numerical data; and a registration processing unit that registers a parameter expressing a measurement condition in performing the three-dimensional measurement in the recognition processing unit, wherein the registration processing unit includes:

a setting receiving unit that receives a manipulation of setting a value of the parameter;

a tentative recognition performing unit that provides the parameter setting value received by the setting receiving unit to the recognition processing unit, performs three-dimensional measurement and recognition processing based on the measurement result of the three-dimensional measurement, and displays information indicating the recognition result on a monitor device, the three-dimensional measurement being aimed at a real model image of the target object produced by the imaging unit;

a sample data setting unit that receives a manipulation of adopting the recognition result displayed by the tentative recognition performing unit and sets numerical data indicating the recognition result as sample data;

a numerical range specifying unit that specifies a numerical range of the parameter, which is set while numerical data in which an amount of difference with the sample data falls within a predetermined value, by performing a step A and a step B in a plurality of cycles, the setting value of the parameter being changed every time within a predetermined numerical range including the parameter value set in obtaining the recognition result set to the sample data in the step A, the three-dimensional measurement being performed by the set parameter using the real model image in the step A, recognition processing being performed based on the three-dimensional measurement result of the step A to check numerical data indicating the recognition result with the sample data in the step B; and a registration value specifying unit that registers a numerical value as a parameter in the recognition processing unit, the numerical value being located at predetermined distances from an upper limit and a lower limit of the numerical range specified by the numerical range specifying unit.

* * * * *